United States Patent
Ahammed et al.

(10) Patent No.: US 11,372,675 B2
(45) Date of Patent: Jun. 28, 2022

(54) JOBS SYNCHRONIZE FRAMEWORK

(71) Applicant: Bank of America Corporation, Charlotte, NC (US)

(72) Inventors: Jabir M. Ahammed, Karala (IN); Vinod Patil, Dallas, TX (US); Paul Eric Hazboun, Flower Mound, TX (US); Pritika Bhatia, Haryana (IN); Nadeem Panjwani, Carrollton, TX (US); Douglas J. Goddard, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 261 days.

(21) Appl. No.: 16/901,151

(22) Filed: Jun. 15, 2020

(65) Prior Publication Data
US 2021/0389975 A1    Dec. 16, 2021

(51) Int. Cl.
*G06F 9/46* (2006.01)
*G06F 9/48* (2006.01)
(Continued)

(52) U.S. Cl.
CPC ............. *G06F 9/4856* (2013.01); *G06F 9/52* (2013.01); *G06F 16/27* (2019.01); *G06F 16/273* (2019.01)

(58) Field of Classification Search
CPC .......... G06F 9/4856; G06F 9/52; G06F 16/27; G06F 16/273
See application file for complete search history.

(56) References Cited

U.S. PATENT DOCUMENTS 6,571,285 B1 * 5/2003 Groath ................... H04L 43/00 709/224
6,985,901 B1 * 1/2006 Sachse ................ H04L 41/5032 709/224
(Continued)

FOREIGN PATENT DOCUMENTS

CN    111258989 A  *  6/2020
WO   WO-2004040399 A2 *  5/2004  ......... G06F 16/2282
(Continued)

OTHER PUBLICATIONS

"Database Concepts," https://docs.oracle.com/cd/E11882_01/server.112/e40540/intro.htm#CNCPT939. Oracle, Retrieved on Apr. 23, 2020.
(Continued)

*Primary Examiner* — Richard G Keehn
(74) *Attorney, Agent, or Firm* — Weiss & Arons LLP

(57) ABSTRACT

Current systems for synchronizing multiple database systems suffer from technical drawbacks. For example, archive jobs run on a second database system are typically started independently of operational jobs that are run on a first database system and generate the output data that needs to be archived. The lack of synchronization between first and second database systems delays access to the output data from within the second database system. Apparatus and methods described herein synchronize migration of output data generated by a first database system into a second database system, despite incompatibility between the first and second database systems. Apparatus and methods may synchronize the second database system such that it archives output data generated by the first database system within a target time of successful generation of output data by the first database system.

20 Claims, 7 Drawing Sheets

800

209

| Shell Script #3 - DB2 Log File ||||||
|---|---|---|---|---|---|
| DB2 Task # | Linked DB1 Task | Scheduled Start Time | Status | Last Status Check ||
| 1 | 445 | 12:00 am (CST) | Started | 6:20 am (CST) ||
| 2 | 10 | 12:00 am (CST) | Waiting | 4:50 am (CST) ||
| 3 | 35 | 12:00 am (CST) | Started | 10:50 am (CST) ||
| 4 | 1 | 12:00 am (CST) | Waiting | 4:40 am (CST) ||

(51) Int. Cl.
*G06F 16/27* (2019.01)
*G06F 9/52* (2006.01)

(56) References Cited

U.S. PATENT DOCUMENTS

| | | | | |
|---|---|---|---|---|
| 7,571,173 | B2* | 8/2009 | Yang | G06F 16/258 |
| 8,782,101 | B1* | 7/2014 | Moore | G06F 16/258 |
| | | | | 707/811 |
| 8,819,659 | B2* | 8/2014 | Ramer | G06F 16/2428 |
| | | | | 717/109 |
| 2005/0256908 | A1* | 11/2005 | Yang | G06F 16/258 |
| 2018/0075044 | A1* | 3/2018 | Kruglikov | G06F 16/214 |
| 2020/0364242 | A1* | 11/2020 | Martin | G06F 16/214 |

FOREIGN PATENT DOCUMENTS

| | | | |
|---|---|---|---|
| WO | WO-2008124181 A1 * | 10/2008 | G06F 8/60 |
| WO | WO-2022048385 A1 * | 3/2022 | |

OTHER PUBLICATIONS

"What Is a Data Warehouse?" https://www.oracle.com/database/what-is-a-data-warnhouse/, Oracle, Retrieved on Apr. 23, 2020.

* cited by examiner (Prior-Art)

DB1 Configuration File 400

| DB1 Task # 401 | Start Time 403 | End Time 405 | Status 407 | Last Status Check 409 |
|---|---|---|---|---|
| 1 | 1:30 am (CST) | 4:30 am (CST) | In progress | 5:00 am (CST) |
| ... | ... | ... | ... | ... |
| 10 | 1:30 am (CST) | 4:30 am (CST) | In progress | 5:00 am (CST) |
| ... | ... | ... | ... | ... |
| 35 | 2:30 am (CST) | 1:30 pm (CST) | Completed | 10:30 am (CST) |
| ... | ... | ... | ... | ... |
| 50 | 11:00 am (CST) | 4:00 pm (CST) | Ready | 12:00 pm (CST) |
| ... | ... | ... | ... | ... |
| 445 | 4:00 am (CST) | 6:00 am (CST) | Completed | 6:30 am (CST) |
| ... | ... | ... | ... | ... |
| 500 | 5:30 am (CST) | 6:30 am (CST) | Error | 6:00 am (CST) |
| Pause Job 411 | 12:00 am (CST) | - | - | - |

| DB2 Configuration File 207 | | | | |
|---|---|---|---|---|
| DB2 Task # 501 | Linked DB1 Task 503 | Scheduled Start Time 505 | Status 507 | Last Status Check 509 |
| 1 | 445 | 12:00 am (CST) | Waiting | 6:15 am (CST) |
| 2 | 10 | 12:00 am (CST) | Waiting | 5:30 am (CST) |
| 3 | 35 | 12:00 am (CST) | Ready | 11:00 am (CST) |
| 4 | 1 | 12:00 am (CST) | Waiting | 6:30 am (CST) |

| Shell Script #1 - DB2 Log File 209 | | | | |
|---|---|---|---|---|
| DB2 Task # | Linked DB1 Task | Scheduled Start Time | Status | Last Status Check |
| 1 | 445 | 12:00 am (CST) | Waiting | - |
| 2 | 10 | 12:00 am (CST) | Waiting | - |
| 3 | 35 | 12:00 am (CST) | Waiting | - |
| 4 | 1 | 12:00 am (CST) | Waiting | - |

| Shell Script #2 - DB2 Log File ||||| 
|---|---|---|---|---|
| DB2 Task # | Linked DB1 Task | Scheduled Start Time | Status | Last Status Check |
| 1 | 445 | 12:00 am (CST) | Ready | 6:10 am (CST) |
| 2 | 10 | 12:00 am (CST) | Waiting | 4:50 am (CST) |
| 3 | 35 | 12:00 am (CST) | Ready | 10:40 am (CST) |
| 4 | 1 | 12:00 am (CST) | Waiting | 4:40 am (CST) |

800

| Shell Script #3 - DB2 Log File ||||| 
|---|---|---|---|---|
| DB2 Task # | Linked DB1 Task | Scheduled Start Time | Status | Last Status Check |
| 1 | 445 | 12:00 am (CST) | Started | 6:20 am (CST) |
| 2 | 10 | 12:00 am (CST) | Waiting | 4:50 am (CST) |
| 3 | 35 | 12:00 am (CST) | Started | 10:50 am (CST) |
| 4 | 1 | 12:00 am (CST) | Waiting | 4:40 am (CST) |

| | Shell Script #4 - DB2 Log File | | | |
|---|---|---|---|---|
| DB2 Task # | Linked DB1 Task | Scheduled Start Time | Status | Last Status Check |
| 1 | 445 | 12:00 am (CST) | Completed | 7:30 am (CST) |
| 2 | 10 | 12:00 am (CST) | Waiting | 4:50 am (CST) |
| 3 | 35 | 12:00 am (CST) | Completed | 11:30 am (CST) |
| 4 | 1 | 12:00 am (CST) | Waiting | 4:40 am (CST) |

FIG. 9

| | Shell Script #5 - DB2 Log File | | | |
|---|---|---|---|---|
| DB2 Task # | Linked DB1 Task | Scheduled Start Time | Status | Last Status Check |
| 1 | Pause Job | 12:00 am (CST) | Waiting | 6:20 am (CST) |
| 2 | Pause Job | 12:00 am (CST) | Waiting | 4:50 am (CST) |
| 3 | Pause Job | 12:00 am (CST) | Waiting | 10:50 am (CST) |
| 4 | Pause Job | 12:00 am (CST) | Waiting | 4:40 am (CST) |

FIG. 10

JOBS SYNCHRONIZE FRAMEWORK

FIELD OF TECHNOLOGY

Aspects of the disclosure relate to improving operation of database systems and archival of output data generated by database systems.

BACKGROUND

Database systems may be complex and include multiple sub-systems. Each sub-system may provide specialized software and/or hardware optimized for performing targeting data analysis.

For example, a first database system may provide efficient data management and robust security. The first database system may be designed for enterprise grid computing. Grid computing may utilize groups of independent, modular hardware and software components. The modular components may be dynamically connected or disconnected to meet changing data analysis needs. However, components of the first database system may be proprietary. Proprietary components may be relatively expensive to maintain and may be associated with costly bulk storage options.

A second database system may provide efficient data storage capabilities. For example, the second database system may be designed to provide centralized and consolidated storage of output data generated by multiple sources. The second database system may provide data warehousing or data lake capabilities.

A data warehouse is typically designed to manage large quantities of data from various sources. A data lake may store an abundance of disparate, unfiltered data. The stored data may be later retrieved for a particular purpose. Data stored by the second database system may be generated by any suitable source such as business applications, mobile apps, social media, Internet of Things devices, and other database systems. The second database system may be designed to provide low-cost storage for unformatted, unstructured data generated by multiple sources.

However, the first database system may be incompatible with the second database system. For example, the first database system may include proprietary components (software or hardware) designed for efficiently performing targeted data analysis operations. Thus, there may not be a straightforward way of utilizing the first database system for efficiently processing data and then utilizing the second database system to efficiently store the data outputs generated by the first database system.

Typically, solutions for solving this technical problem are inefficient, brute force solutions. These solutions may eventually store data outputs generated by the first database system within the second database system. However, such solutions are associated with a significant time delay until the data outputs generated by the first database system are available within the second database system.

Furthermore, the brute force nature of the prior solutions typically detracts from the efficiency advantages provided by the second database system. Finally, the prior art solutions are not easily adjustable to in response to a change in circumstances or business goals.

It would be desirable to provide a technical solution for reducing a time delay when storing data outputs generated by a first database system in a second database system.

Accordingly, it is desirable to provide systems and methods for JOBS SYNCHRONIZE FRAMEWORK.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows contents of an illustrative file in accordance with principles of the disclosure;

FIG. 5 shows contents of an illustrative file in accordance with principles of the disclosure;

FIG. 6 shows contents of an illustrative file in accordance with principles of the disclosure;

FIG. 9 shows contents of an illustrative file in accordance with principles of the disclosure; and FIG. 10 shows contents of an illustrative file in accordance with principles of the disclosure.

DETAILED DESCRIPTION

Figure 1:
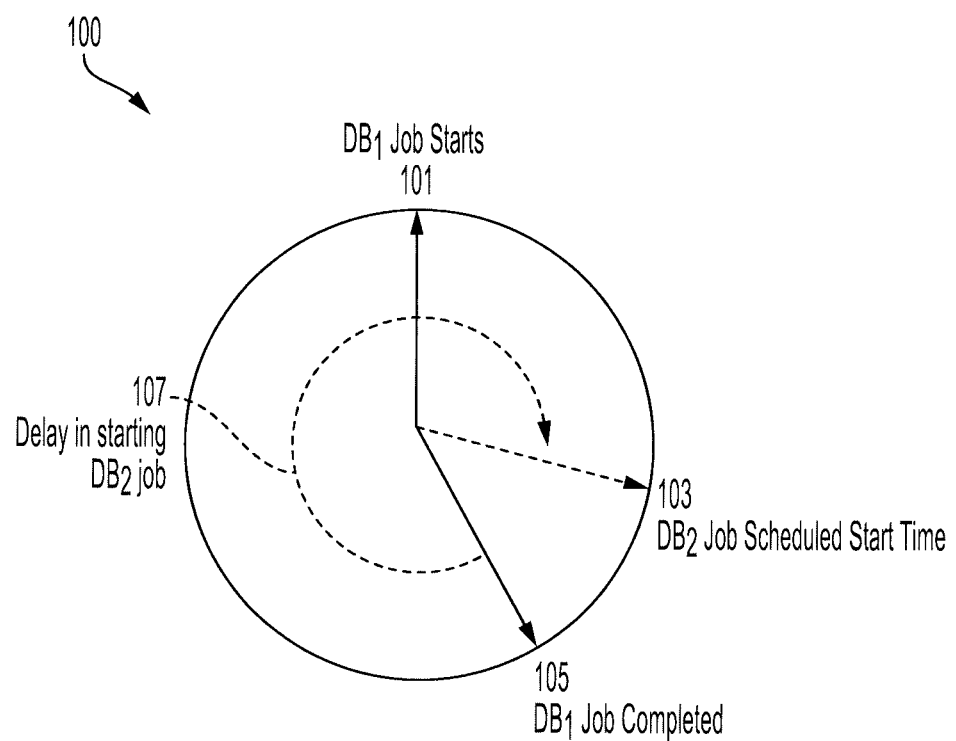
FIG. 1 shows an illustrative prior-art process.

A first database system may generate output data. However, using the first database system to archive the generated output data may be expensive and inefficient. The first database system may require proprietary components only available at relatively high costs. The proprietary components may be incompatible with components of a second database system. For example, the first database system may be controlled by a different operating system and system architecture than the second database system.

A second database system may provide massive and efficient storage for any kind of data. The second database system may be an open-source software framework for storing data on clusters of commodity hardware. For example, the second database system may be a Hadoop® open-source type system that is designed to provide cost-efficient, reliable, and scalable distributed storage using low-cost, commodity hardware components.

Methods may synchronize migration of output data generated by the first database system into the second database system. Despite incompatibility between the first and second database systems, methods may synchronize the second database system such that output data generated by the first database system is archived by the second database system within a target time from when the output data was generated by the first database system. Methods may allow the inexpensive and reliable bulk storage capabilities of the second database system to be utilized for timely storing the output data generated by the first database system.

Methods may include executing a series of shell scripts. A shell script may include a file containing a series of commands. The "shell" is a computer program that accepts commands and transfers them to the operating system for execution. The shell reads the script and carries out the series of commands. Shell scripts may be executed on the first and/or second database systems.

Methods may include executing a first shell script. The first shell script may be run on the first database system. The first shell script may be run on the second database system. The first shell script extracts a target operational task from a configuration file. The configuration file may be resident on the first database system. The configuration file may be resident on the second database system. The configuration file may include attributes of the operational task.

Illustrative attributes may include a name of the operation task. Illustrative attributes may include database schema associated with the operational task. Database schema may include logical representations, such as how data is organized by the operational task and how the operational task organizes relationships among data items. The database schema may express a constraint or structure that is applied by the operational task to data stored within the first database system.

Database schema may include physical and logical database schema. Physical database schema may describe storage of output data generated by the operational task and structure of the output data such as files or indices. Physical database schema may also define how output data should be stored in archival storage.

Logical database schema may describe logical constraints that are applied by the operational task to the output data. For example, logical database schema may describe tables, views, and integrity constraints associated with the output data.

The configuration file may include scheduling information associated with the operational task. Scheduling information may include how often (e.g., frequency) the operational task is configured to be executed by the first database system. Scheduling information may include when the operational task is scheduled to be run by the first database system. For example, illustrative scheduling information may include time(s) of day and which day(s) of week the operational task is scheduled to be executed by the first database system.

Illustrative attributes included in the configuration file may link an archival task to the operational task. The archival task may be configured to be executed on the second database system. The archival task may be configured to store the output data generated by the operational task. The archival task may only be configured to execute after output data is generated by successful execution of the operational task on the first database system.

An operational task may complete execution earlier than expected. For example, less data may have been generated during an illustrative time interval. Therefore, it may take less time for the operational task to process the smaller amount of data and generate output data. Despite earlier availability of the output data, a linked archival task will not execute until its default scheduled time.

Thus, despite availability of the output data, the output data will not be archived until the default scheduled run time of the archival task, de-synchronizing the first and second database systems. De-synchronization may refer to when the first database system has successfully generated output data, but the second database system has not yet archived the output data.

In other scenarios, an operational task may complete execution later than expected. A technical failure on the first database system may delay execution of the operational task and generation of output data. More data may have been generated during an illustrative time interval and it may take longer for the operational task to process the larger amount of data.

If the archival task does not execute at its scheduled run time (e.g., because output data is not yet available), execution of the archival task will be delayed until the next scheduled run time. However, the operational task may successfully complete execution after the first scheduled run time of the archival task and before the next scheduled run time. Despite the availability of the desired output data and before the next scheduled run time, the archival task will not execute until its next default scheduled time. Thus, output data generated by the operational task will not be archived until the next scheduled run time of the archival task, de-synchronizing the first and second database systems.

The first shell script may examine the configuration file associated with the operational task. The first shell script may identify a target operational task that, when executed by the first database system, generates output data that is scheduled to be archived within a second database system by an archival task executed by the second database system. The first shell script may locate the linked archival task that is dependent on the successful execution of the target operational task.

The first shell script may assign a status of the linked archival task to "waiting." The first shell script may modify an entry in a log file associated with the linked archival task to assign the status. The first shell script may create the log file. A "waiting" status indicates the linked archival task is associated with a default schedule expected to trigger execution of the archival task after the target operational task successfully generates the output data.

Methods may include executing a second shell script. The second shell script monitors a status of the target operational task on the first database system. The second shell script determines whether the target operational task has been successfully executed by the first database system.

For example, the second shell script may periodically examine a log file associated with one or more operational tasks scheduled for execution by the first database system. The log file may be updated when the target operational task has been successfully executed by the first database system. The log file may record execution attributes of the target operational task. Illustrative execution attributes recorded in the first log file may include a start-time, an end-time and a real-time execution status of the target operational task.

After detecting successful execution of the target operational task by the first database system, the second shell script changes the status of the linked archival task in the log file from "waiting" to "ready." In some embodiments, after detecting successful execution of the target operation task, the second shell script may create a new entry in a log file for the linked archival task.

The "ready" status indicates that the target operational task has successfully generated the output data that forms the input for the archival task. The "ready" status indicates that the first and second database systems are currently de-synchronized.

Methods may include executing a third shell script. The third shell polls the status associated with the linked archival task in the log file. For example, the third shell script may periodically examine the log file associated with the archival task. The log file may be updated (e.g., by the first and second shell scripts) and the third shell script may determine when the archival task is associated with a "ready" status.

The third shell script triggers execution of the linked archival task on the second database system when the archival status is associated with a "ready" status. The third shell script may force start the archival task by triggering execution of the linked archival task earlier than when the archival task would have been executed by a default schedule associated with the archival task.

After triggering execution of the linked archival task, the third shell script changes the status of the linked archival task in the log file from "ready" to "started." By triggering execution of the archival task earlier than in a default schedule, the output data generated by the target operational is stored on the second database system, synchronizing the first and second database systems.

Methods may include executing a fourth shell script. The fourth shell script monitors execution of the linked archival task by the second database system. When the linked archival task is successfully executed, the fourth shell script changes the status of the linked archival task in the log file from "started" to "completed."

The fourth shell script may periodically examine the log file associated with the archival task. The log file may be updated (e.g., by the first, second and third shell scripts). The fourth shell script may change the status recorded in the activity log file from "ready" to "completed."

When the linked archival task is associated with a "completed" status, output data generated by the target operational task is stored on the second database system. When the linked archival task is associated with a "completed" status, with respect to the target operational and archival tasks, the first and second database systems may be synchronized. Execution of the first, second, third and fourth shell scripts may be coordinated so that the linked archival task is executed by the second database system within 40 minutes of successfully execution of the target operation task by the first database system.

The executing of the second, third and fourth shell scripts may monitor a log file that records a start-time, an end-time and a real-time status of the linked archival task. The log file may be resident on the first database system. The log file may be resident on the second database system.

Methods may include creating a first configuration file. Methods may include creating a second configuration file. The first configuration file may record attributes associated with one or more operational tasks. The second configuration file may record attributes associated with one or more archival tasks. The first configuration files may be resident on the first database system. The first configuration files may be resident on the second database system. The first configuration files may be resident on a third computer system.

Illustrative attributes recorded in the first configuration file may include information regarding the target operational task, the location of a log file listing a status of operational tasks, the linked archival task dependent of the target operational task, and a default schedule for execution of the linked archival task by the second database system.

The second configuration file may include attributes of the archival task. The second configuration file may be resident on the first database system. The second configuration file may be resident on the second database system. The second configuration files may be resident on a third computer system.

Illustrative attributes recorded in the second configuration file may include information regarding the archival task such as a name of the archival task, the location of a log file listing a status of archival tasks and the linked operational task dependent that generates output data for an archival task.

The second configuration file may include default scheduling information associated with archival tasks. Default scheduling information may include how often (e.g., frequency) an archival task is configured to be executed by a second database system. Default scheduling information may include when the archival task is scheduled to run by the second database system. For example, an illustrative scheduling information may include time(s) of day and which day(s) of week the archival task is scheduled to be executed by the second database system.

Methods may include executing the second, third and fourth shell scripts every 10 minutes. Frequently executing the second, third and fourth shell scripts may reduce an amount of time the first and second database systems are de-synchronized.

Methods for triggering execution of an archival task are provided. The archival task may be executed by a second database system. The archival task may store output data in the second database system. The output data may be generated by an operational task executed by a first database system. The second database system may not have direct access to a real-time status of the operational task executed within the first database system.

Absent methods disclosed herein, the archival task may be configured to operate in accordance with a default schedule. The default schedule may be designed to execute after successful execution of the operational task generates the output data. However, the default schedule may not ensure that the first and second database systems are maintained as synchronized as possible. In some scenarios, such as when successful execution of the operational task is delayed, the default schedule may increase the amount of time the first and second database systems are de-synchronized. De-synchronization may refer to when the first database system has successfully generated output data, but the second database system has not yet archived the output data.

Methods may include creating a first log file. The first log file may reside on the first database system. The first log file may record a scheduled start-time of the operational task, an expected end-time of the operational task and a status of the operational task. Methods may include creating a first configuration table. The first configuration table may link an archival task scheduled for execution by the second database system to the target operational task. The first configuration table may reside on the first database system or any other suitable location.

Methods may include creating a second log file. The second log file may reside on the first database system or any other suitable location. The second log file may record a status of the archival task scheduled for execution by the second database system.

Methods may include executing a first shell script. The first shell script may determine when to change the status of the operational task recorded in the first log file. Methods may include executing a second shell script. The second shell script may determine when the status of the operational task recorded in the first log file indicates that the operational task has been successfully executed by the first database system. After successful execution of the operational task, the second shell script forces premature execution of the archival task on the second database system.

Forcing premature execution may include triggering execution of the archival task earlier than a start-time specified in a default schedule for the archival task. The default schedule may be defined in the second configuration file.

Methods may include forcing premature execution of the archival task by triggering execution of the archival task on the second database system within 30 minutes of a successful execution of the operational task on the first database system. Execution of the first and second shell scripts may be coordinated to achieve a 30 minute or any suitable temporal target.

Forcing premature execution of the archival task on the second database system may reduce an amount of time the first and second database system are de-synchronized. For example, forcing premature execution of the archival task within 30 minutes of a successful execution of the operational task on the first database system may limit de-synchronization to 30 minutes.

Before forcing premature execution of the archival task on the second database system, methods may include determining whether a threshold number of archival tasks are executing concurrently on the second database system. Methods may include controlling any premature triggering of the archival tasks such that the threshold number is not exceeded.

For example, the second shell script may determine whether a threshold number of archival tasks are executing concurrently on the second database system. The second shell script may only force premature execution of an archival task when triggering execution of the archival task will not exceed the threshold number of archival tasks executing concurrently on the second database system.

Methods may include executing a third shell script. The third shell script determines when to change a status of the archival task in the second log file. The third shell script may monitor execution of the archival task and update the second log file when the archival task successfully executed, fails or has been terminated.

Methods may include executing a fourth shell script. The fourth shell script may extract an archival task from a configuration file resident on the first database system. The fourth shell script may create a new entry in the second log file for the extracted archival task. The fourth shell script may, after extracting the archival task from the configuration file, set the status of the extracted archival task in the second log file to "waiting."

Methods may include executing the fourth shell script at least once a day. Methods may include executing the fourth shell script prior to execution of the first, second or third shell scripts.

The operational task may be one of a plurality of operational tasks running on the first database system. Each of the plurality of operational tasks may be scheduled to be executed by the first database system at a different time of day. The collective execution of the first, second and third shell scripts may force premature execution of a plurality of archival tasks. Each of the plurality of archival tasks may be linked to at least one of the plurality of operational tasks.

For example, each of the plurality of archival tasks may be require output data generated by at least one of the plurality of operational tasks. Methods may include prematurely triggering each of the plurality of archival tasks so that they are executed within 30 minutes of successful execution of a corresponding operational task.

The first shell script may be executable on the first database system or the second database system. The second shell script may be executable on the first database system or the second database system. The third shell script may be executable on the first database system or the second database system. The fourth shell script may be executable on the first database system or the second database system.

A system for reducing a time delay between successful execution of operational tasks on a first database system and execution of archival tasks on a second database system is provided. Before being executed, the archival task may require output data generated by the operational task.

The system may utilize computer-executable instructions, such as software, executed by a microprocessor or computer system. Generally, software may include program modules, routines, programs, objects, components, data structures, etc. that perform tasks or implement abstract data types/structures. The system may be operational with distributed computing environments where tasks are performed by remote processing devices linked through a communication network. In a distributed computing environment, program modules may be located in both local and remote computer storage media including memory storage devices.

Software may be stored within the non-transitory memory and/or other storage media. The software may provide instructions to the microprocessor for enabling the system to perform various functions. For example, the non-transitory memory may store software used by the system, such as an operating system, application programs, web browser and a database.

The system may include a first configuration file. The first configuration file may store attributes associated with a plurality of operational tasks scheduled for execution by the first database system. The system may include a second configuration file. The second configuration file may store attributes associated with a plurality of archival tasks scheduled for execution by the second database system. The second configuration file may store attributes for a plurality of archival tasks scheduled for execution during any suitable time period. An illustrative time period may be a day, week, or month. Each of the plurality of archival tasks may require, as input, output data generated by at least one of the plurality of operational tasks.

The system may include a first shell script. The first shell script may initialize a log file. The log file may record which of the plurality of archival tasks included in the second configuration file is expected to be scheduled for execution during the time period by the second database system.

The system may include a second shell script. The second shell script may monitor execution of the plurality of operational tasks referenced in the first configuration file. For each of the plurality of operational tasks that successfully executes and generates output data, the second shell script may amend the log file to indicate which of the plurality of archival tasks referenced in the second configuration file are now ready for execution by the second database system.

The system may include a third shell script. The third shell script periodically checks the status of each of the plurality of archival tasks included in the log file. For each of the plurality of archival tasks that is ready for execution, the third shell script force starts the corresponding archival task on the second database system.

Force starting an archival task triggers execution of the archival task earlier than the corresponding archival task was scheduled to be executed by the second database system. The force starting therefore reduces latency between generating of the output data by an operational task on the first database system and the archiving of the generated output data by the second database system.

For each of the plurality of archival tasks that is force started, the third shell script amends the log file to indicate which of the plurality of archival tasks have been force started and are now running on the second database system.

The system may include a fourth shell script. The fourth shell script monitors each of the plurality of archival tasks that have been force started on the second database system. For each archival task that successfully executes, the fourth shell script amends the log file to indicate that the corresponding archival task has been successfully executed by the second database system. Successful execution of an archival tasks indicates that the output data generated by the first database system has been successfully stored on the second database system.

Before force starting any of the plurality of archival tasks, the third shell script may determine whether a threshold number of the archival tasks are concurrently executing on the second database system. When a threshold number of archival tasks are concurrently executing, the third shell script delays the force start of any additional archival tasks until at least one of the threshold number of concurrently executing archival tasks completes its execution.

The system may include a fifth shell script. The fifth shell script may suspend force starting any of the plurality of archival tasks. The fifth shell script switches on or off the capability of the system to force start archival tasks.

The fifth shell script may alter the second configuration file such that at least one of the archival tasks is dependent on output data generated by a pause operational task. A pause operation task may be specially designed to not generate any output data. Because the pause operational task does not generate any output data, the second shell script will not detect that the pause operational task has ever successfully executed. Therefore, the second shell script will also not amend the log file to indicate that any of the plurality of archival tasks included in the second configuration file and linked the pause operational task are "ready" for execution by the second database system.

Because the plurality of archival tasks linked the pause operational task will not be associated with a "ready" status in the log file, the third shell script will not force start any archival tasks linked the pause operational task. Execution of the archival tasks may still be triggered by a default schedule associated with the archival tasks.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative prior-art process 100. In prior-art process 100, output data generated by a first database system ("$DB_1$") is archived by a second database system ("$DB_2$"). However, $DB_1$ and $DB_2$ may be incompatible. The incompatibility may be due to a proprietary nature on one of the database systems or different system architectures utilized by each of the database systems. FIG. 1 shows that an operational task is scheduled to begin execution on $DB_1$ at time 101. Because of the incompatibility, archival tasks performed by $DB_2$ may be scheduled to start at time 103. Time 103 is estimated to occur after an operational task is successfully executed by $DB_1$. Time 103 may be selected to provide time for the $DB_1$ operational task to successfully execute and generated output data that will be archived by $DB_2$.

However, process 100 shows that if there is a delay in successful execution of the $DB_1$ operational task until time 105, the archiving of the output data may be significantly delayed by time 107. Specifically, the archiving of the output data generate by the $DB_1$ operational task may be delayed until the next time 103 (after time 105) the $DB_2$ archival task is scheduled to run. Such a delay may result in $DB_1$ and $DB_2$ remaining de-synchronized for the duration of delay 107. Furthermore, the output data generated by $DB_1$ may not be backed up or archived for the duration of delay 107.

Figure 2:
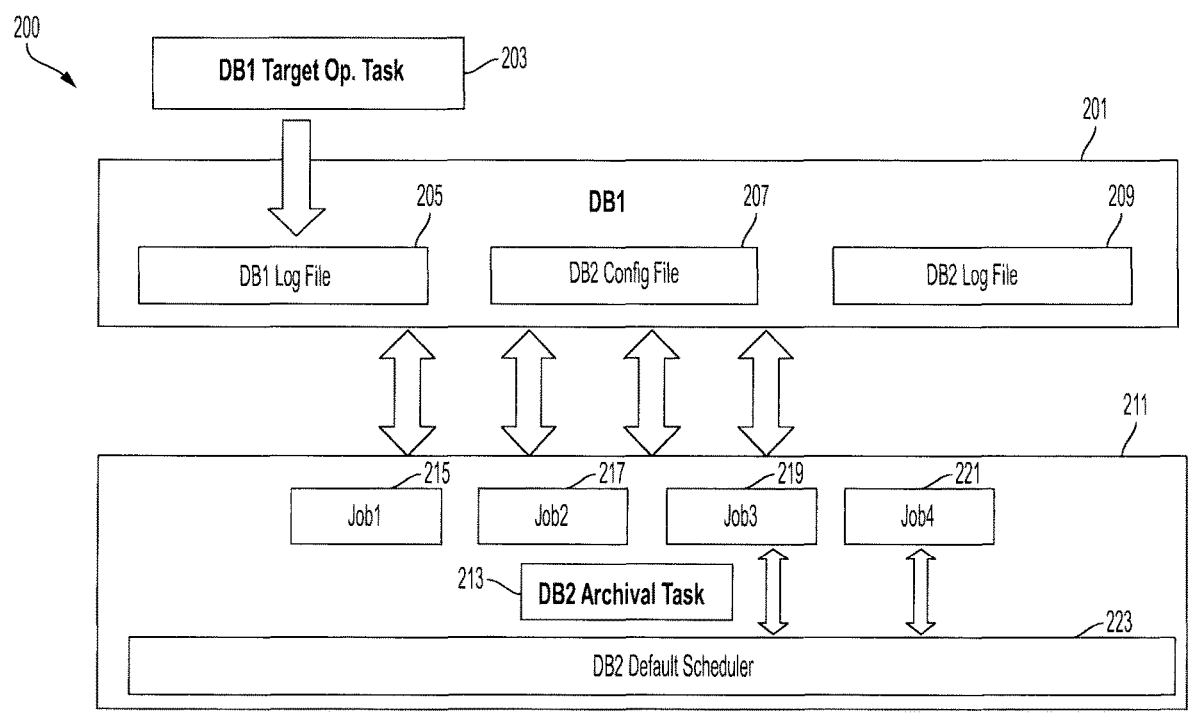
FIG. 2 shows an illustrative system in accordance with principles of the disclosure.

FIG. 2 shows illustrative system architecture 200. System architecture 200 includes first database system 201. System architecture 200 includes second database system 211. System 200 includes target operational task 203. Target operational task 203 is configured to be executed by first database system 201.

System architecture 200 includes $DB_1$ log file 205. System architecture 200 shows that $DB_1$ log file 205 is resident on first database system 201. $DB_1$ log file 205 may record a status of target operational task 203. For example, $DB_1$ log file 205 may record whether target operational task 203 has been successfully executed, has failed to execute or has been terminated before successfully executing.

System architecture 200 may include one or more shell scripts. System architecture 200 may include any suitable number of shell scripts. System architecture 200 may include shell scripts that are configured to execute on first database system 201 or second database system 211. System architecture 200 may include shell scripts that are configured to execute on first database system 201 and second database system 211.

FIG. 2 shows that system architecture 200 includes shell scripts 215 (Job1), 217 (Job2), 219 (Job3) and 221 (Job4). Shell scripts 215 (Job1), 217 (Job2), 219 (Job3) and 221 (Job4) are all resident on second database system 211. In other embodiments, one or more of shell scripts 215 (Job1), 217 (Job2), 219 (Job3) and 221 (Job4) may be resident on first database system 201.

System architecture 200 includes $DB_2$ configuration file 207. $DB_2$ configuration file 207 is shown as being resident on first database system 201. In other embodiments, $DB_2$ configuration file 207 may be resident on second database system. $DB_2$ configuration file 207 may include attributes of one or more operational tasks such as target operational task 203.

Illustrative attributes may include a logical name of target operational task 203. Illustrative attributes may include database schema associated with target operational task 203. Illustrative attributes may include scheduling information associated with target operational task 203. Scheduling information may include how often (e.g., frequency) target operational task 203 is configured to be executed by first database system 201. Scheduling information may include when target operational task 203 is scheduled to run by first database system 201.

Illustrative attributes included in a configuration file may show archival tasks (executable on second database system 211) that are linked to operational tasks (executable on second database system 201). For example, $DB_2$ configuration file 207 may record that archival task 213 is linked to target operational task 203. Archival task 213 may be linked to target operational task 203 because it is stores output data generated by target operational task 203. Archival task 213 may only be configured to execute after output data is generated by successfully execution of target operational task 203.

However, target operational task 203 may complete execution earlier than expected. For example, during an illustrative time interval, less input data may be generated than during prior time intervals. Target operational task 203 may therefore complete execution faster than expected and generate the output data faster than expected.

Despite earlier availability of the output data, as shown in FIG. 1, due to actual or potential incompatibility of first and second database systems, prior-art systems would not trigger execution of linked archival task 213 until its default scheduled time 103. The resulting time delay may de-synchronize first and second database systems 201 and 211.

In other scenarios, target operational task 203 may complete execution later than expected. For example, a technical failure on first database system 201 may delay execution of target operational task 203. However, target operational task 203 may successfully complete execution at time 105 (shown in FIG. 1). Time 105 may be after default scheduled run time (e.g., time 103 shown in FIG. 1) of archival task 213 and before the next default scheduled run time of archival task 213. Despite availability of output data generated by target operational task 203, as shown in FIG. 1, prior-art systems may delay execution of archival task 213 by time 107 until its next default scheduled time.

Thus, in prior-art systems, output data generated by target operational task 203 will not be archived until the next scheduled default run time of archival task 213, potentially de-synchronizing the first and second database systems 201 and 211. System architecture 200 may reduce or eliminate any delay between generation of output data by target operational task 203 and the storing of the output data on second database system 211 by archival task 213.

First shell script 215 may examine $DB_2$ configuration file 207. The first shell script 215 detects that target operational task 203, when executed by first database system 201, successfully generates output data that is scheduled to be archived in second database system 211 by linked archival task 213. First shell script 215 may be configured to execute at least once a day. Shell script 215 extracts linked archival task 213 from $DB_2$ configuration file 207. Shell script 215 may insert extracted archival task 213 into $DB_2$ log file 209. Shell script 215 may record a status of archival task 213 in $DB_2$ log file 209 as "WAITING."

Second shell script 217 monitors all WAITING entries in $DB_2$ log file 209. Second shell script 217 also monitors for completion of target operational task 203 on first database system 201. Second shell script 217 may detect completion of target operational task 203 by examining $DB_1$ log file 205. When second shell script 217 detects that target operational task 203 has successfully completed, second shell script 217 changes the status of archival task 213 in $DB_2$ log file 209 to "READY."

Third shell script 219 detects when an archival task such as archival task 213 has been marked at READY in $DB_2$ log file 209. When archival task 213 is associated with a READY status in $DB_2$ log file 209, third shell script 219 triggers a force start of archival task 213 on second database system 211.

A default schedule associated with an archival task may be implemented by any suitable job scheduling software that provides scheduling, monitoring, and reporting functions. Illustrative job scheduling software may include "Workload Automation AE (AutoSys Edition)" provided by CA Technologies of New York, N.Y.

Third shell script 219 may trigger the force start of archival task 213 by issuing a command to job scheduling software. After triggering the force start of archival task 213, third shell script 219 changes the status of archival task 213 in $DB_2$ log file 209 to "STARTED."

Before triggering a force start of archival task 213, third shell script 219 may perform a threshold check on the number of archival tasks concurrently executing on second database system 211. Third shell script 219 may not trigger execution of archival task 213 if doing so will negatively impact performance of second database system 211. Third shell script 219 may continually monitor the number of tasks concurrently executing on second database system 211 and only trigger execution of archival task 213 when doing do so will not degrade performance of second database system 211.

Before triggering a force start of archival task 213, third shell script 219 may also check whether archival task 213 is already executing. For example, archival task 213 may still be processing output data from a previously scheduled job (e.g., yesterday) or may have already been triggered by a default schedule. When third shell script 219 detects that archival task 213 is already executing, it may not re-start or force start archival task 213.

Fourth shell script 221 monitors all STARTED archival tasks listed in $DB_2$ log file 209. Fourth shell script 221 may check whether archival tasks listed in $DB_2$ log file 209 have been successfully executed by second database system 211. For example, fourth shell script 221 may query a job scheduling software for a current status of archival task 213. Fourth shell script 221 update a status (e.g., success/failure/terminated) of archival task 213 in $DB_2$ log file 209.

Shell scripts 215 (Job1), 217 (Job2), 219 (Job3) and 221 (Job4) may be executed multiple times during a frequency interval. Executing shell scripts 215, 217, 219 and 221 at least once during a frequency interval may reduce an amount of time first and second database systems 201 and 211 are de-synchronized. An illustrative frequency interval may be 10 minutes. Executing shell scripts 215, 217, 219 and 221 at least once during each 10-minute interval may ensure that archival task 213 is triggered within 10 minutes of when target operational task 203 generates output data.

Figure 3:
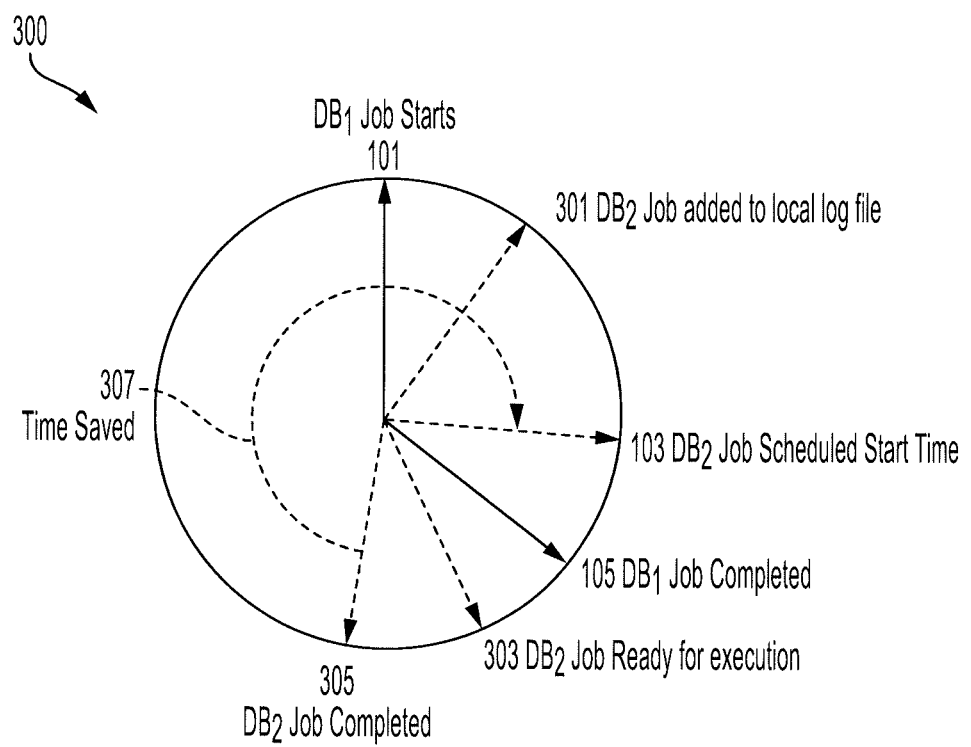
FIG. 3 shows an illustrative process in accordance with principles of the disclosure.

FIG. 3 shows illustrative improved timing 300. Improved timing 300 may be generated as a result of utilizing system architecture 200 shown in FIG. 2. A default schedule associated with an archival task executed by $DB_2$ is scheduled to start at time 103. Time 103 is estimated to be after a $DB_1$ operational task generates output data. FIG. 3 shows that the $DB_1$ operational task is scheduled to begin at time 101. The time interval between times 101 and 103 may be estimated to provide for the $DB_1$ operational task to successfully execute and generate output data that will be archived by $DB_2$.

However, FIG. 1 showed that if there is a delay in successful execution of the $DB_1$ operational task, the archiving of the output data may be delayed by time 107. FIG. 3 shows that as a result of deploying system architecture 200, the archival task is force started at time 303. Time 303 is after operational task has successfully generated output data at time 105. Because the $DB_2$ archival task is started at time 303, the $DB_2$ archival task completes successful execution at time 305. FIG. 3 shows that this results in time saving 307.

Time saving 307 shows that using system architecture 200 allows a $DB_2$ archival task to begin execution on $DB_2$ in closer proximity to completion of the operation task on $DB_1$. Time saving 307 also shows that using system architecture 200 allows the $DB_2$ archival task to complete execution on $DB_2$ earlier than prior-art systems. Earlier completion of archival tasks on $DB_2$ ensure $DB_1$ and $DB_2$ are de-synchronized for less time than when using prior-art systems. Earlier completion of archival tasks on $DB_2$ ensures that output data generated by $DB_1$ is available within $DB_2$ faster than when using prior-art systems.

FIG. 4 shows illustrative $DB_1$ configuration file 400. $DB_1$ configuration file 400 includes a listing of operational tasks 401. $DB_1$ configuration file 400 may include 500 or more operational tasks.

Each operational task listed in $DB_1$ configuration file 400 is associated with start-time 403. Start-time 403 may be a time when first database system 201 is configured to begin execution of the corresponding operational task.

Each operational task listed in $DB_1$ configuration file 400 is associated with end-time 405. End-time 405 may be an estimated time when first database system 201 is configured to successfully complete execution of the corresponding operational task. End-time 405 may be when output data generated by an operational task is expected to be available.

Each operational task listed in $DB_1$ configuration file 400 is associated with status 407. Status 407 may be a current status of an operational task when the first database system checked an execution status of the operational task at time 409.

$DB_1$ configuration file 400 shows that although operational task #1 has a scheduled end-time of 4:30 am (CST), as of 5:00 am (CST) it is still in progress. Thus, $DB_1$ configuration file 400 shows that operational task #1 has not successfully executed and generated its output data as anticipated. The delay in generating the output data may in turn prevent a linked archival task from successfully executing in accordance with its default schedule.

$DB_1$ configuration file 400 also shows that although operational task #35 has a scheduled end-time of 1:30 pm (CST), as of 10:30 am (CST) it has already successfully completed. Thus, $DB_1$ configuration file 400 shows that output data generated by operational task #35 is ready for being archived by a second database system earlier than anticipated. However, a default schedule associated with linked archival task may not execute until after the end-time of 1:30 pm (CST).

FIG. 4 also shows that $DB_1$ configuration file 400 includes pause operational task 411. $DB_1$ configuration file 400 shows that pause operational task 411 is associated with a start-time 403 and not an end-time 405.

Pause operational task 411 may be specially designed to not generate any output data. Therefore, pause operational task 411 has no end-time 405. Because pause operational task 411 does not generate any output data, second shell script 217 will not ever detect that pause operational task 411 has been successfully completed. Therefore, second shell script 217 will also not amend the $DB_2$ log file 209 to indicate that any archival tasks linked pause operational 411 task are "ready" for execution by the second database system.

Because the archival tasks linked to pause operational task 411 will never be associated with a "ready" status in $DB_2$ log file 209, third shell script 219 will not force start any archival tasks linked to pause operational task 411. Archival tasks linked to pause operational task 411 may still be triggered by a default schedule associated with the archival tasks.

FIG. 5 shows illustrative view 500 of $DB_2$ configuration file 209 (shown in FIG. 2). View 500 shows that $DB_2$ configuration file 209 includes a listing of archival tasks 501. View 500 shows that each of archival tasks 501 is linked to a corresponding operational task 503. A linked archival task requires, as its input, output data generated by the corresponding operational task. For example, view 500 shows that archival task #3 requires, as its input, output data generated by operational task #35 (shown above in $DB_1$ configuration file 400).

View 500 shows that archival tasks 501 are associated with default scheduled start-time 505. Default scheduled start-time 505 may be estimated to be after output data has been generated by linked operational tasks 503.

View 500 shows that default scheduled start-time 505 associated with archival task #1 is 12:00 am (CST). Archival task #1 is linked operational task #445. $DB_1$ configuration file 400 shows that operational task #445 has completed execution as of 6:30 am (CST) (see above, FIG. 4). However, in accordance with default scheduled start-time 505, archival task #1 will not be triggered because its default scheduled start-time 505 is 12:00 am (CST), which has already passed. Therefore, waiting for default scheduled start-time 505 will delay the archiving of output data generated by operational task #445 by about 18 hours.

View 500 shows that default scheduled start-time 505 associated with archival task #3 is 12:00 am (CST). Archival task #3 is linked operational task #35. $DB_1$ configuration file 400 shows that operational task #35 has completed execution as of 10:30 am (CST), earlier than the expected completion time of 1:30 pm (CST) (see above, FIG. 4).

However, in accordance with default scheduled start-time 505, archival task #3 will not be triggered because its default scheduled start-time 505 is 12:00 am (CST), which has already passed. Therefore, waiting for default scheduled start-time 505 will delay the archiving of output data generated by operational task #445 by about 13 hours.

FIG. 6 shows illustrative view 600 of $DB_2$ log file 209 (shown in FIG. 2). View 600 shows $DB_2$ log file 209 after being initialized by first shell script 215. View 600 shows that first shell script 215 has extracted linked archival tasks from $DB_2$ configuration file 207. View 600 shows that first shell script 215 has created an entry in $DB_2$ log file 209 for each pair of linked archive and operational tasks.

View 600 also shows that first shell script 215 has assigned an initial "WAITING" status to each archival task. A WAITING status indicates that each archival task is waiting for its corresponding operational task to complete execution and successfully generate output data.

First shell script 215 may initialize $DB_2$ log file 209 at the start of a day or in accordance with any suitable schedule. First shell script 215 may update $DB_2$ log file 209 two or more time daily.

Figure 7:
FIG. 7 shows contents of an illustrative file in accordance with principles of the disclosure.

FIG. 7 shows illustrative view 700 of $DB_2$ log file 209 (shown in FIG. 2). View 700 shows $DB_2$ log file 209 after being updated by second shell script 217. View 700 shows that second shell script 217 has checked on a status of each operational task listed in $DB_1$ configuration file 400 (shown in FIG. 4).

View 700 shows that second shell script 217 has determined that as of 6:10 am (CST), operational task #445 has successfully completed execution. Therefore, second shell script 217 has changed a status of archive task #1 to "READY." View 700 shows that second shell script 217 has determined that as of 10:40 am (CST), operational task #35 has successfully completed execution. Therefore, second shell script 217 has changed a status of archive task #3 to "READY."

As of 4:50 am (CST), operational task #10 is still listed in DB$_1$ configuration file 400 as in progress. Therefore, second shell script 217 does not change the WAITING status of linked archival task #2.

As of 4:40 am (CST), operational task #1 is still listed in DB$_1$ configuration file 400 as in progress. Therefore, second shell script 217 does not change the WAITING status of linked archival task #4.

Figure 8:
FIG. 8 shows contents of an illustrative file in accordance with principles of the disclosure.

FIG. 8 shows illustrative view 800 of DB$_2$ log file 209 (shown in FIG. 2). View 800 shows DB$_2$ log file 209 after being updated by third shell script 219. View 800 shows that third shell script 219 has force started archive tasks #1 and #3. Therefore, third shell script 219 has changed a status of archive tasks #1 and #3 to "STARTED."

Notably, third shell script 219 has force started archive tasks #1 and #3 before default scheduled start-time 505 associated with these archive tasks in DB$_2$ configuration file 207.

View 800 shows that at 6:20 am (CST), archival task #1 has started executing. This is about 20 minutes after DB$_1$ configuration table 400 has listed corresponding operational task #445 as having successfully completed execution (see column 409). This is about 17 hours earlier than when archival task #1 would have been triggered by default scheduled start time 505 listed in DB$_2$ configuration file 207 (shown in FIG. 5).

View 800 shows that at 10:50 am (CST), archival task #3 has started executing. This is about 20 minutes after DB$_1$ configuration table 400 has listed corresponding operational task #35 as having successfully completed execution (see column 409). This is about 13 hours earlier than when archival task #3 would have been triggered by default scheduled start time 505 listed in DB$_2$ configuration file 207 (shown in FIG. 5).

FIG. 9 shows illustrative view 900 of DB$_2$ log file 209 (shown in FIG. 2). View 900 shows DB$_2$ log file 209 after being updated by fourth shell script 221. Fourth shell script 221 has changed a status of archive task #1 to "COMPLETED." View 900 shows that fourth shell script 219 has determined, as of 7:30 am (CST), archive task #1 has successfully stored the output data generated by operational task #445 in second database system 211. This is approximately 16 hours earlier than had archive task #1 waited to be triggered at default scheduled start-time 505.

View 900 also shows that fourth shell script 221 has changed a status of archive task #3 to "COMPLETED." View 900 shows that fourth shell script 219 has determined, as of 11:30 am (CST), archive task #3 has successfully stored the output data generated by operational task #35 in second database system 211. This is approximately 12 hours earlier than had archive task #3 waited to be triggered at default scheduled start-time 505.

FIG. 10 shows illustrative view 1000 of DB$_2$ log file 209 (shown in FIG. 2). View 1000 shows DB$_2$ log file 209 when each of archival tasks 501 (shown in FIG. 5) have been linked to pause operational task 411 (shown in FIG. 4).

A fifth shell script may alter DB$_2$ configuration file 207 such that one or more of archival tasks 501 are dependent on output data generated by pause operational task 411. Pause operation task 411 may be specially designed to not generate any output data. Because pause operational task 411 does not generate any output data, second shell script 215 will not detect that pause operational task 411 has been successfully completed.

Therefore, second shell script 411 will also not change a status of archival tasks 501 in DB$_2$ log file 209 from "WAITING" to "READY." When linked to pause operational task 411, archival tasks 501 will not be associated with a READY status in DB$_2$ log file 209, therefore third shell script 217 will not force start any of archival tasks 501.

Linking archival tasks 501 to pause operational task 411 has the effect of switching-off the functional described herein. Even when linked to pause operational task 411, execution of archival tasks 501 may still be triggered at default scheduled start-time 505.

Thus, methods and apparatus for JOBS SYNCHRONIZE FRAMEWORK are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for synchronizing migration of operational tasks executed by a first database system into a second database system, wherein the first database system is incompatible with the second database system, the method comprising:

executing a first shell script that:
extracts from a configuration file resident on the first database system, a target operational task that, after successfully execution by the first database system, generates output data scheduled to be archived by the second database system;
locates a linked archival task that is scheduled for execution by the second database system and dependent on the successful execution of the target operational task; and
assigns a status of the linked archival task to waiting;

executing a second shell script that:
monitors a status of the target operational task on the first database system, and determines whether the target operational task has been successfully executed by the first database system; and
after detecting successful execution of the target operational task by the first database system, changes the status of the linked archival task from waiting to ready;

executing a third shell script that:
polls the status of the linked archival task;
when the status of the linked archival task is ready, triggers execution of the linked archival task on the second database system using the data output generated by the target operational task successfully executed by the first database system; and
changes the status of the linked archival task from ready to started; and executing a fourth shell script that:
monitors execution of the linked archival task by the second database system, and when the linked archival task is successfully executed, changes the status of the linked archival task from started to completed;

wherein, execution of the first, second, third and fourth shell scripts ensures that the linked archival task is executed by the second database system within 40 minutes of successful execution of the target operational task by the first database system.

2. The method of claim 1, wherein the second shell script polls the status of the target operational task by examining a first log file listing a status of one or more operational tasks scheduled for execution by the first database system.

3. The method of claim 2, wherein after detecting successful execution of the target operation task, the second shell script adds the linked archival task as a new entry in a second log file.

4. The method of claim 1, the executing of the second shell script monitors a first log file on the first database system that records a start-time, an end-time and a real-time status of the target operational task.

5. The method of claim 4, the executing of the second, third and fourth shell scripts monitors a second log file on the first database system that records a start-time, an end-time and a real-time status of the linked archival task.

6. The method of claim 1, wherein the configuration file is a first configuration file, the method further comprising extracting information from a second configuration file on the first database system storing information regarding the location of a log file, the linked archival task, and a default schedule for execution of the linked archival task by the second database system.

7. The method of claim 1, wherein each of the second, third and fourth shell scripts execute every 10 minutes.

8. A method for triggering execution of an archival task within a second database system using output data generated by an operational task executed within a first database system, wherein the second database system does not have access to a status of the operational task executed within the first database system, the method comprising:
creating:
a first log table that comprises a scheduled start-time of the operational task, an expected end-time of the operational task and a status of the operational task;
a configuration table linking the archival task scheduled for execution by the second database system to the operational task; and
a second log table storing a status of the archival task scheduled for execution by the second database system;
detecting a change in the status of the operational task in the first log file;
determining when the status of the operational task recorded in the first log file indicates the operational task has been successfully executed on the first database system; and
after successful execution of the operational task, forcing premature execution of the archival task on the second database system; and
determining when to change the status of the archival task in the second log file;
wherein the forcing the premature execution of the archival task on the second database system comprises triggering execution of the archival task within 30 minutes of when the operational task generates the output data.

9. The method of claim 8 further comprising extracting the archival task from the configuration file and creating a new entry in the second log file for the archival task.

10. The method of claim 9 further comprising extracting the archival task from the configuration file at least once a day before detecting the change in the status of the operational task in the first log file.

11. The method of claim 9, further comprising, after extracting the archival task from the configuration file, setting the status of the archival task in the second log file to waiting.

12. The method of claim 8, further comprising:
before forcing premature execution of the archival task on the second database system, determining whether a threshold number of archival tasks are executing concurrently on the second database system; and
triggering execution of the archival task such that the threshold number is not exceeded.

13. The method of claim 8, further comprising triggering execution of the archival task earlier than a default scheduled time associated with the archival task on the second database system.

14. The method of claim 8, further comprising disabling the capability to force premature execution of the archival task on the second database system and thereby triggering the execution of the archival task at a default scheduled time associated with the archival task on the second database system.

15. The method of claim 8 wherein:
the operational task is one of a plurality of operational tasks running on the first database system;
each of the operational tasks are scheduled to be executed by the first database system at a different time of day;
dynamically forcing premature execution of a plurality of archival tasks such that each of the plurality of archival tasks executes within 30 minutes of successful execution of the corresponding operational task; and
each of the plurality of archival tasks are linked to at least one of the plurality of operational tasks.

16. A system for reducing a time delay between successful execution of operational tasks on a first database system and archival tasks on a second database system that require data outputs generated by the operational task, the system comprising:
a first configuration file storing a plurality of operational tasks scheduled for execution by the first database system;
a second configuration file storing a plurality of archival tasks scheduled for execution during a day by the second database system, each of the plurality of archival tasks requiring output data generated by at least one of the plurality of operational tasks;
a first shell script that initializes a log file indicating which of the plurality of archival tasks included in the second configuration file is scheduled for execution during the day by the second database system;
a second shell script that:
monitors execution of the plurality of operational tasks included in the first configuration file; and
for each of the plurality of operational tasks that successfully executes, amends the log file to indicate which of the plurality of archival tasks included in the second configuration file are now ready for execution by the second database system; and
a third shell script that periodically checks the status of each of the plurality of archival tasks included in the log file, and for each of the plurality of archival tasks that is ready for execution, force starts the corresponding archival task on the second database system;
wherein the force starting triggers execution of the corresponding archival task earlier in the day than the corresponding archival task was scheduled to be executed by the second database system, thereby reducing latency between generating of the output data by execution of the plurality of operational tasks on the first database system and the archiving of the output data by the second database system.

17. The system of claim 16 wherein, for each of the plurality of archival tasks that is force started, the third shell script amends the log file to indicate which of the plurality of archival tasks have been force started on the second database system.

18. The system of claim 16 further comprising a fourth shell script that monitors each of the plurality of archival tasks that have been force started on the second database system, and for each archival task that successfully executes, amends the log file to indicate that each archival task has been successfully executed by the second database system.

19. The system of claim 16 wherein, before force starting any of the plurality of archival tasks, the third shell script:
- determines whether a threshold number of the archival tasks are concurrently executing on the second database system, and
- when the threshold number of archival tasks are concurrently executing, delays the force starting of an additional archival task until at least one of the threshold number of concurrently executing archival tasks completes its execution.

20. The system of claim 16 further comprising a fifth shell script that suspends the force starting any of the plurality of archival tasks by changing the second configuration file such that at least one of the archival tasks are dependent on output data generated by a pause operational task;
- wherein the pause operational task does not generate any output data thereby preventing the first shell script from amending the log file to indicate that the at least one of the archival tasks is ready for execution by the second database system.

* * * * *